US012664964B2

(12) United States Patent
Witt et al.

(10) Patent No.: US 12,664,964 B2
(45) Date of Patent: Jun. 23, 2026

(54) ACOUSTIC DAMPING ELEMENT WITH IMPROVED STACKABILITY

(71) Applicant: SIKA TECHNOLOGY AG, Baar (CH)

(72) Inventors: Robert Witt, Rodgau (DE); Marko Vidovic, Frankenthal (DE); Frederick Schwab, Frankfurt (DE); Christian Hardt, Kelsterbach (DE); Jan Spengler, Breuberg (DE)

(73) Assignee: SIKA TECHNOLOGY AG, Baar (CH)

( * ) Notice: Subject to any disclaimer, the term of this patent is extended or adjusted under 35 U.S.C. 154(b) by 207 days.

(21) Appl. No.: 18/568,452

(22) PCT Filed: Jun. 27, 2022

(86) PCT No.: PCT/EP2022/067530
§ 371 (c)(1),
(2) Date: Dec. 8, 2023

(87) PCT Pub. No.: WO2023/280610
PCT Pub. Date: Jan. 12, 2023

(65) Prior Publication Data

US 2024/0282286 A1 Aug. 22, 2024

(30) Foreign Application Priority Data

Jul. 7, 2021 (EP) .................................... 21184355

(51) Int. Cl.

| | |
|---|---|
| ***G10K 11/168*** | (2006.01) |
| ***B32B 15/06*** | (2006.01) |
| ***B32B 37/12*** | (2006.01) |

(52) U.S. Cl.
CPC ............ *G10K 11/168* (2013.01); *B32B 15/06* (2013.01); *B32B 37/1284* (2013.01); *B32B 2307/102* (2013.01); *B32B 2307/7376* (2023.05)

(58) Field of Classification Search
None
See application file for complete search history.

(56) References Cited

U.S. PATENT DOCUMENTS

| | | | |
|---|---|---|---|
| 5,695,867 A | 12/1997 | Saitoh et al. | |
| 2001/0044503 A1 | 11/2001 | Born et al. | |
| 2013/0319791 A1* | 12/2013 | Stopin | B32B 11/04 181/290 |

FOREIGN PATENT DOCUMENTS

| | | |
|---|---|---|
| EP | 3828226 A1 | 6/2021 |
| JP | H05-220883 A | 8/1993 |
| JP | H09-123356 A | 5/1997 |

OTHER PUBLICATIONS

Aug. 30, 2022 Search Report issued in International Patent Application PCT/EP2022/067530.
Aug. 30, 2022 Written Opinion issued in International Patent Application No. PCT/EP2022/067530.

* cited by examiner

*Primary Examiner* — Sheeba Ahmed
(74) *Attorney, Agent, or Firm* — Oliff PLC

(57) ABSTRACT

A vibration and noise damping element including a damping layer having first and second surfaces and an adhesive layer covering at least part of the first surface. The damping layer is composed of a damping layer material with a viscosity at 60° C. of 30'000-500'000 Pa*s containing at least one rubber component and the adhesive layer is composed of an adhesive layer material with a viscosity at 60° C. of 50'000-300'000 Pa*s containing at least one rubber component. The ratio of the thickness of the damping layer d1 to the adhesive layer d2 (d1/d2) is 0.6-4.0 and the sum (d1+d2) is 0.5-2.5 mm. The element shows good performance in the ball drop test at low temperatures, has good adhesion to the substrate it is applied to, provides good vibration and noise damping properties and guarantees easy separation after storage at temperatures between 30-50° C.

15 Claims, 2 Drawing Sheets

ACOUSTIC DAMPING ELEMENT WITH IMPROVED STACKABILITY

TECHNICAL FIELD

The present invention relates to vibration and noise damping elements in mechanical structures of manufactured articles. In particular, the present invention relates to vibration and noise damping elements, which are suitable for use in damping of vibrations of components and structures contained in articles of automotive industry, home appliances, and general industry.

BACKGROUND OF THE INVENTION

Acoustic damping materials are widely used in automotive, home appliance and general industries for reducing of undesired vibrations, structure borne noise, and air borne noise. For example, in automotive vehicles, it is desirable to prevent transfer of vibrations generated by the motors, pumps, gears and other dynamic force generators through the body of the vehicle into the passenger compartment. Structure borne noise is produced when the vibrations generated by a dynamic force generator are transmitted through a supporting structure, typically a frame or other hollow structure, to a noise emitting surface, such as a metallic or plastic panel, which transforms the mechanical vibrations into sound waves. Structure borne noise and vibrations in general can be effectively reduced by application of vibration damping materials directly to the structures and surfaces of components subjected to vibrational disturbances, such as surfaces of vehicle panels, floors, and shells of machines, washers, and dryers.

JP H09123356 A discloses a heat-resistant anti-vibration sheet comprising a paperboard layer, a rubber sheet layer and a pressure-sensitive adhesive layer. This anti-vibration sheet can be adhered to a vehicle body before the before painting and baking process after painting.

JP H05220883 A discloses a three-layer laminated vibration damping sheet comprising a highly elastic restraint layer made of an aluminum foil, an medium elastic restraint layer made of a vulcanized EPDM rubber admixture and a butyl rubber-based low elastic adhesive layer.

EP 3 828 226 A1 describes an acoustic damping material comprising a binder matrix comprising a bitumen component or a polymer component, and a filler component comprising at least one solid particulate cellulose-containing filler. The acoustic damping material is suitable for use in damping of undesired vibrations and noise in mechanical structures and components of manufactured articles.

Acoustic damping materials used for damping of vibrations of panels and plates are commonly provided in form of pre-formed single- and multi-layer damping elements or as liquid compositions, which are applied directly on surface of a substrate. Damping materials designed for damping of vibrations and noise in hollow structures such as cavities are usually provided in form of cavity filler inserts comprising an expandable composition and one or more attaching members, which are capable of holding the cavity filler insert in a desired position within the hollow structure.

Pre-formed single- and multiple-layer damping elements comprise a damping layer, which is in direct contact with a surface of the substrate to be damped against vibrational disturbances. The damping layer is capable of dissipating kinetic energy of the vibrating surface into heat energy through extension and compression of the material of the damping layer. Widely used materials for damping layers include bitumen- and rubber-based compositions comprising relatively high amounts of particulate fillers and varying amount of additives, in particular plasticizers, rheology modifiers, and drying agents. Pre-formed single- and multiple-layer damping elements often comprise a layer of an adhesive composition, such as a pressure sensitive adhesive (PSA) or a hot-melt adhesive, to enable bonding of the damping layer to a surface of a substrate, such as a panel or floor of an automotive vehicle. Liquid applied damping systems are typically thermally drying, gelling, or reactive compositions, which are applied on the surface of the substrate in liquid state, for example by spraying.

Acoustic damping materials used for damping of vibrations of panels and plates can also be provided in form of constrained layer damping elements, which contain a damping layer and a stiff outer layer that "constraints" the damping layer thereby sandwiching it between the stiff outer layer and the surface of the substrate to be damped. The stiffness of the outer layer is generally a factor of ten times higher than the stiffness of the layer of damping material. Commonly used materials for the outer top layer include, for example, aluminum and fiber glass fabrics. Constrained layer dampers are typically more effective in damping of undesired vibrations than single-layer damping elements but they are also more expensive to produce.

Cavity filler inserts are used for damping of air borne noise within the cavity of a hollow structure component and to prevent vibrations from being transmitted through the walls of the cavity. A cavity filler insert typically consists of a damping material and at least one attachment member capable of holding the cavity filler insert in a desired position within the hollow structure. The damping material of the cavity filler insert is typically formulated as an expandable composition, which upon activation, such as at elevated temperature, expands and forms a seal around the interior surface of the wall of the cavity. Expandable damping materials suitable for damping of air borne noise within a cavity are commonly referred to as "acoustic baffles".

Bitumen-based compositions have been widely used as acoustic damping materials in the automotive and home appliance industry, since these are low cost materials with high vibration damping properties as well as reliable and easily controllable physical properties. In the home appliance market, bitumen based damping systems currently have almost 100% market share. Highly filled bitumen compositions have been in particular used for providing sound proofing coverings and anti-drumming coatings, which are applied to metal and plastic components in assembly processes of automotive vehicles and household appliances. According to a conventional procedure, a mixture of bitumen and fillers is first extruded and/or calendered to form films, from which suitable shaped parts suitable for use as damping elements are prepared by punch or die cutting. The damping elements are then bonded to the metal or plastic sheet to be damped. It is also possible that the shaped part is further adapted to the shape of the metal or plastic sheet by heating.

One of the main application areas of acoustic damping elements includes the interior of automotive vehicles and washing machines in home appliances. In these applications, these elements are subjected to exposure to low temperatures, especially in the case of automotive vehicles, during their use. In the automotive industry, the quality and performance at low temperature of around −20 to −40° C. of the components used in automotive vehicles is controlled by the car producers. For example, the ball drop test at −30° C. is used to assess the adhesion of the acoustic damping elements in the cold. Further, a good adhesion of the vibration and noise damping element on the substrate at room temperature is a necessity as well.

These vibration and noise damping element are often provided in the form of stocks of multiple elements on top of each other, with a protective film, typically a siliconized protective film on each adhesive layer, in order to prevent the single elements to stick to each other. However, during transport and/or storage, especially at temperatures between 30-50° C., the present rubber-based damping elements suffer from lateral leakage of the adhesive layer and/or damping layer. This prevents the later separation or unstacking without possibly damaging the single elements.

There is thus a need for a novel type of vibration and noise damping element, which guarantees easy separation or unstacking after storage at temperatures between 30-50° C. and preferably shows good performance in the ball drop test at low temperatures, especially at −30° C., preferably has a good adhesion to the substrate it is applied to and provides good vibration and noise damping properties.

SUMMARY OF THE INVENTION

The object of the present invention is to provide a vibration and noise damping element, which guarantees easy separation or unstacking after storage at temperatures between 30-50° C., preferably shows good performance in the ball drop test at low temperatures, especially at −30° C., preferably has a good adhesion to the substrate it is applied to and provides good vibration and noise damping properties.

The subject of the present invention is vibration and noise damping element as defined in claim 1.

It was also surprisingly found out that the vibration and noise damping element according to the invention exhibits similar or even improved vibration and noise damping properties compared to commercially available rubber-based vibration and noise damping elements. In particular, it was found out that the vibration and noise damping element of the present invention exhibits a high vibration damping performance as defined by the loss factor at temperatures around 10-20° C., which makes it especially suitable for use in damping of vibrations and noise of structures and components of automotive vehicles.

Other subjects of the present invention are presented in other independent claims. Preferred aspects of the invention are presented in the dependent claims.

DETAILED DESCRIPTION OF THE INVENTION

Figure 1:
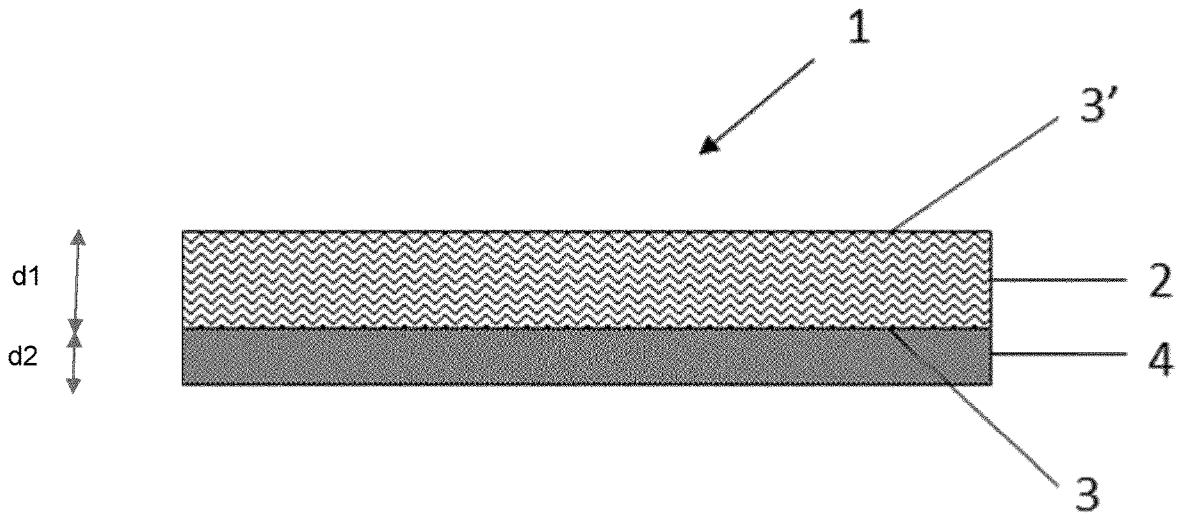
FIG. 1 shows a cross-section of a vibration and noise damping element (1) comprising a damping layer (2) having a first surface (3) and a second surface (3'), and an adhesive layer (4) covering the first surface (3) of the damping layer (2).

The subject of the present invention is a vibration and noise damping element (1) comprising:

i) A damping layer (2) having a first surface (3) and a second surface (3') and
ii) An adhesive layer (4) covering at least a portion of the first surface (3) of the damping layer (2).

The damping layer (2) is composed of a damping layer material with a viscosity at 60° C. of 30'000-500'000 Pa*s containing at least one rubber component Ru and the adhesive layer (4) is composed of an adhesive layer material with a viscosity at 60° C. of 50'000-300'000 Pa*s containing at least one rubber component Ru. The viscosity is determined according to DIN 54458 oscillographically by means of a rheometer with heatable plate (gap 500 μm, measuring plate diameter: 25 mm (plate/plate), deformation 1%, angular frequency 10 rad/s).

A viscosity of the damping layer material at 60° C. of less than 30'000 Pa*s leads to insufficient stackability performance. On the other hand, a viscosity at 60° C. of more than 500'000 Pa*s leads to insufficient adhesion, especially on metal surfaces. This can be seen for example in the comparison of Ref. 4 with Ex. 1 and Ex. 2 in table 4.

It is also preferred, if the damping layer material has a viscosity at 100° C. of 20'000-150'000 Pa*s, preferably 25'000-100'000 Pa*s, most preferably 30'000-50'000 Pa*s.

Further, a viscosity of the adhesive layer material at 60° C. of less than 50'000 Pa*s also leads to insufficient stackability performance. Also, a viscosity at 60° C. of more than 300'000 Pa*s leads to insufficient adhesion and insufficient ball drop test at low temperatures performance. This is shown in the comparison of Ref. 2 and Ref. 3 with Ex. 1 in table 4.

It is further preferred, if the adhesive layer material has a viscosity at 100° C. of 60'000-200'000 Pa*s, preferably 65'000-150'000 Pa*s, most preferably 70'000-100'000 Pa*s.

The ratio of the thickness of the damping layer (2) d1 to the thickness of the adhesive layer (4) d2 (d1/d2) is 0.6-4.0. Surprisingly it was found that a ratio of less than 0.6 leads to insufficient stackability performance. In addition, a ratio of more than 4.0 leads to insufficient ball drop test at low temperatures performance, as seen in the comparison of Ref. 1 and Ref. 6-8 with Ex. 1 and Ex. 3.

Preferably, the ratio (d1/d2) is 0.8-3.0, more preferably 1.2-2.5. This is advantageous with respect to a good stackability performance. This can be seen in the comparison of Ex. 1 with Ex. 3 in table 4.

The sum of the thickness of the damping layer (2) d1 and the thickness of the adhesive layer (4) d2 (d1+d2) is 0.5-2.5 mm. It was found that a sum of less than 0.5 mm leads to insufficient adhesion. On the other hand, a sum of more than 2.5 mm leads to insufficient ball drop test at low temperatures performance. This is shown in the comparison of Ref. 9 with Ex. 1 and Ex. 4-6.

It is advantageous if the sum of the thickness (d1+d2) is 0.75-2.1 mm, preferably 1.25-1.9 mm. This leads to high adhesion values as seen in the comparison of Ex. 1 with Ex. 4-6.

A cross-section of the vibration and noise damping element according to the present invention is shown in FIG. 1.

According to one or more embodiments, the damping layer is sheet-like element having a first and a second major surfaces defining a thickness there between and a length and width at least 5 times, preferably at least 15 times, more preferably at least 25 times greater than the thickness of the sheet-like element. The term "thickness" preferably refers to a dimension of a sheet-like element that is measured in a plane that is perpendicular to the length and width dimensions of the element. In embodiments, in which the damping layer is sheet-like element, the first and second surfaces of the damping layer correspond to the first and second major surfaces of a sheet-like element.

The damping layer and the adhesive layer are preferably directly connected to each other over their opposing surfaces. The expression "directly connected" is understood to mean in the context of the present invention that no further layer or substance is present between the two layers and that the opposing surfaces of the layers are directly adhered to each other. According to one or more embodiments, the adhesive layer covers at least 50%, preferably at least 65%, more preferably at least 75% of the first surface of the damping layer. According to one or more further embodiments, the adhesive layer covers substantially the entire area of the first surface of the damping layer. The expression "substantially entire area" is understood to mean at least 90%, preferably at least 95%, more preferably at least 98.5% of the total area.

Preferably, the damping layer material is not identical to the adhesive layer material.

The adhesive layer (4) is composed of an adhesive layer material with a viscosity at 60° C. of 50'000-300'000 Pa*s containing at least one rubber component Ru. Preferably the adhesive layer material has a viscosity at 60° C. of 60'000-200'000 Pa*s, preferably 65'000-150'000 Pa*s, most preferably 70'000-100'000 Pa*s.

Preferably, the thickness of the adhesive layer (4) d2 is 0.25-0.85 mm, more preferably 0.35-0.80 mm, most preferably 0.45-0.75 mm.

It is further preferred, if the adhesive layer material has an adhesion of ≤grade 3, preferably ≤grade 2, most preferably grade 1. Said adhesion is determined by the ball drop test at −30° C. according to the Volkswagen group standard, quality requirements, self-adhesive stiffening pads and sound deadening pads, QP M052 page 12, point 3.7.5 Ball drop test/determination of cold adhesion ("Kugelfall/Bestimmung der Kältehaftung"), PV 3971, edition 2020-03, using test samples with a length/width/thickness of the adhesive layer material of 7 cm×7 cm×1.7 mm with an aluminum layer with a thickness of 0.3 mm on top of the adhesive layer material. More preferably, the adhesion is determined as described in the experimental section.

The adhesive layer material contains at least one rubber component Ru. Preferred rubber components Ru are selected from the list of at 25° C. liquid rubber LR selected from the group consisting of at 25° C. liquid polybutenes and at 25° C. liquid polyisobutylenes, butyl rubber BR, natural or synthetic polyisoprene PI, nitrile rubber NBR, ethylene-propylene terpolymer EPDM, ethylene-propylene copolymer EPM and chloroprene rubber CR, preferably selected from the list of at 25° C. liquid rubber LR selected from the group consisting of at 25° C. liquid polybutenes and at 25° C. liquid polyisobutylenes, butyl rubber BR and natural or synthetic polyisoprene PI.

Preferably, the adhesive layer material is an acoustic damping material comprising:

a) ≥0.75 wt.-%, based on the total weight of the acoustic damping material, of at least one polybutadiene PB comprising monomer units derived from 1,3-butadiene (I)

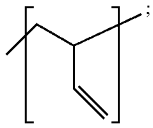

;

(II)

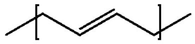

; and (III)

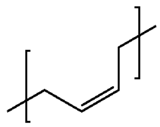

wherein the proportion of monomer units of the formula (I) in the entirety of the monomer units derived from 1,3-butadiene present in the polybutadiene is 25 to 75 mole percent, the proportion of units of the formula (II) in the entirety of the monomer units derived from 1,3-butadiene present in the polybutadiene is 0 to 10 mole percent and the proportion of monomer units of the formula (III) in the entirety of the monomer units derived from 1,3-butadiene present in the polybutadiene is 25 to 75 mole percent, wherein the entirety of the monomer units (I), (II) and (III) add up to 100 mole percent, and the polybutadiene preferably has an average molecular weight of 1000 to 4000 g/mol;

b) ≥10 wt.-%, based on the total weight of the acoustic damping material, of at least one at 25° C. liquid rubber LR selected from the group consisting of at 25° C. liquid polybutenes and at 25° C. liquid polyisobutylenes, preferably at 25° C. liquid polyisobutylenes;

c) ≥3 wt.-%, based on the total weight of the acoustic damping material, of at least one butyl rubber BR;

d) ≥3 wt.-%, based on the total weight of the acoustic damping material, of at least one natural or synthetic polyisoprene PI, preferably natural polyisoprene, most preferably natural rubber;

e) 4-15 wt.-%, based on the total weight of the acoustic damping material, of at least one hydrocarbon resin HR;

f) at least one solid particulate filler FM.

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "polymer" refers to a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "molecular weight" refers to the molar mass (g/mol) of a molecule or a part of a molecule, also referred to as "moiety". The term "average molecular weight" refers to number average molecular weight (Mn) of an oligomeric or polymeric mixture of molecules or moieties. The molecular weight can be determined by conventional methods, preferably by gel permeation-chromatography (GPC) using polystyrene as standard, styrene-divinylbenzene gel with porosity of 100 Angstrom, 1000 Angstrom and 10000 Angstrom as the column and depending on the molecule, tetrahydrofurane as a solvent, at a temperature of 35° C. or 1,2,4-trichlorobenzene as a solvent, at 160° C.

The term "glass transition temperature" (Tg) refers to the temperature above which temperature a polymer component becomes soft and pliable, and below which it becomes hard and glassy. The glass transition temperature (Tg) is preferably determined by dynamical mechanical analysis (DMA) as the peak of the measured loss modulus (G") curve using an applied frequency of 1 Hz and a strain level of 0.1%.

The term "softening point" refers to a temperature at which compound softens in a rubber-like state, or a temperature at which the crystalline portion within the compound melts. The softening point can be determined by Ring and Ball measurement conducted according to DIN EN 1238 standard.

The term "room temperature" designates a temperature of 23° C.

Preferably, the acoustic damping material is essentially free of bitumen. The expression "essentially free" is understood to mean that the acoustic damping may contain only traces of bitumen, such as less than 0.5 wt.-%, preferably less than 0.25 wt.-%, more preferably less than 0.1 wt.-%, still more preferably less than 0.01 wt.-%, based on the total weight of the acoustic damping material. The term "bitumen" designates in the present disclosure blends of heavy hydrocarbons, having a solid consistency at room temperature. These are normally obtained as vacuum residue from refinery processes, which can be distillation (topping or vacuum) and/or conversion processes, such as thermal cracking and visbreaking, of suitable crude oils. Furthermore, the term "bitumen" also designates natural and synthetic bitumen as well as bituminous materials obtained from the extraction of tars and bituminous sands.

The acoustic damping material comprises ≥0.75 wt.-%, based on the total weight of the acoustic damping material, of at least one polybutadiene PB comprising monomer units derived from 1,3-butadiene (I)

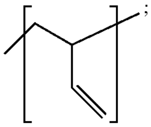;

(II)

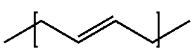; and

-continued (III)

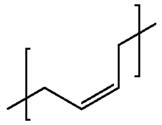

wherein the proportion of units of the formula (I) in the entirety of the monomer units derived from 1,3-butadiene present in the polybutadiene is 25 to 75 mole percent, preferably 50 to 65 mole percent and preferably 59 to 62 mole percent, the proportion of units of the formula (II) in the entirety of the monomer units derived from 1,3-butadiene present in the polybutadiene is 0 to 10 mole percent, preferably 1 to 8 mole percent and preferably 2 to 6 mole percent, and the proportion of units of the formula (III) in the entirety of the monomer units derived from 1,3-butadiene present in the polybutadiene is 25 to 75 mole percent, preferably 25 to 40 mole percent and preferably 35 to 39 mole percent, with the proviso that the entirety of all monomer units (I), (II) and (III) add up to 100 mole percent, and the polybutadiene preferably has an average molecular weight of 1000 to 4000 g/mol, preferably 1200 to 3500 g/mol and preferably 1500 to 3000 g/mol.

In the context of the present invention, the term "polybutadiene" is to be understood as meaning a product obtainable by polymerization of monomer units each having at least two conjugated double bonds, wherein, in order of increasing preference, at least 80%, preferably at least 85%, preferably at least 90%, preferably at least 95%, preferably at least 98%, preferably at least 99%, most preferably at least 99.9% of the monomer units, preferably exclusively, are 1,3-butadiene. Possible further compounds (impurities) may be, e.g. alkanes or alkenes having 3 to 5 carbon atoms, in particular propene, 1-butene or 1,2-butadiene.

The acoustic damping material comprises ≥10 wt.-%, based on the total weight of the acoustic damping material, of at least one at 25° C. liquid rubber LR selected from the group consisting of at 25° C. liquid polybutenes and at 25° C. liquid polyisobutylenes, preferably at 25° C. liquid polyisobutylenes.

The term "at 25° C. liquid polybutene" preferably designates in the present disclosure olefin oligomers comprising isobutylene and/or 1-butene and/or 2-butene. The ratio of the $C_4$-olefin isomers can vary by manufacturer and by grade.

The term "at 25° C. liquid polyisobutylene" preferably designates in the present disclosure polyolefins and olefin oligomers of isobutylene, preferably containing at least 75%, more preferably at least 85% of repeat units derived from isobutylene.

Particularly suitable at 25° C. liquid polybutenes and polyisobutylenes have an average molecular weight of not more than 5'000 g/mol, preferably not more than 3'000 g/mol, more preferably not more than 2'500 g/mol, even more preferably not more than 2'000 g/mol, still more preferably not more than 1'500 g/mol.

The acoustic damping material comprises ≥3 wt.-%, based on the total weight of the acoustic damping material, of at least one butyl rubber BR.

The term "butyl rubber" designates in the present document a polymer derived from a monomer mixture containing a major portion of a $C_4$ to $C_7$ monoolefin monomer, preferably an isoolefin monomer and a minor portion, such as not more than 30 wt.-%, of a $C_4$ to $C_{14}$ multiolefin monomer, preferably a conjugated diolefin. The preferred $C_4$ to $C_7$ monoolefin monomer may be selected from the group consisting of isobutylene, 2-methyl-1-butene, 3-methyl-1-butene, 2-methyl-2-butene, 4-methyl-1-pentene, and mixtures thereof, preferably isobutylene.

Preferably, the at least one butyl rubber BR is selected from the group consisting of butyl rubber and halogenated butyl rubber, preferably butyl rubber, chlorobutyl rubber and bromobutyl rubber, more preferably butyl rubber and bromobutyl rubber, most preferably bromobutyl rubber.

The acoustic damping material comprises ≥3 wt.-%, based on the total weight of the acoustic damping material, of at least one natural or synthetic polyisoprene PI, preferably natural polyisoprene, most preferably natural rubber.

Preferably the at least one natural or synthetic polyisoprene PI has an average molecular weight of ≥100'000 g/mol, preferably 100'000-2'000'000 g/mol, more preferably 100'000-1'000'000 g/mol.

The acoustic damping material comprises 4-15 wt.-%, based on the total weight of the acoustic damping material, of at least one hydrocarbon resin HR.

The term "hydrocarbon resin" preferably designates in the present document synthetic resins made by polymerizing mixtures of unsaturated monomers obtained from petroleum based feedstocks, such as by-products of cracking of natural gas liquids, gas oil, or petroleum naphthas. These types of hydrocarbon resins are also known as "petroleum resins" or as "petroleum hydrocarbon resins". The hydrocarbon resins include also pure monomer aromatic resins, which are prepared by polymerizing aromatic monomer feedstocks that have been purified to eliminate color causing contaminants and to precisely control the composition of the product.

Preferably, the at least one hydrocarbon resin HR has:
- a softening point determined by using the Ring and Ball method as defined in DIN EN 1238 standard of at least 70° C., preferably at least 80° C., more preferably in the range of 70-180° C., preferably 80-150° C., more preferably 90-120° C. and/or, preferably and;
- an average molecular weight (Mn) in the range of 250-7500 g/mol, preferably 300-5000 g/mol.

Suitable hydrocarbon resins are commercially available, for example, under the trade name of Wingtack® series, Wingtack® Plus, Wingtack® Extra, and Wingtack® STS (all from Cray Valley); under the trade name of Escorez® 1000 series, Escorez® 2000 series, and Escorez® 5000 series (all from Exxon Mobile Chemical); under the trade name of Novares® T series, Novares® TT series, Novares® TD series, Novares® TL series, Novares® TN series, Novares® TK series, and Novares® TV series (all from RUTGERS Novares GmbH); and under the trade name of Kristalex®, Plastolyn®, Piccotex®, Piccolastic® and Endex® (all from Eastman Chemicals).

The acoustic damping material comprises e) at least one solid particulate filler FM, preferably at least one solid particulate mineral filler FM.

Preferably, the acoustic damping material comprises 5-75 wt.-%, preferably 15-70 wt.-%, more preferably 25-65 wt.-%, even more preferably 35-65 wt.-%, still more preferably 40-65 wt.-% of the at least one solid particulate filler FM, based on the total weight of the acoustic damping material.

According to one or more embodiments, the at least one solid particulate filler FM is selected from the group consisting of calcium carbonate, magnesium carbonate, calcium oxide, talc, kaolin, diatomaceous earth, wollastonite, feldspar, montmorillonite, dolomite, silica, preferably fumed silica, cristobalite, iron oxide, iron nickel oxide, strontium ferrite, barium-strontium ferrite, hollow ceramic spheres, hollow glass spheres, hollow organic spheres, glass spheres, mica, barium sulfate, and graphite.

The acoustic damping material may optionally contain additives, which are customary for acoustic damping materials. Examples of suitable additives include, for example, pigments, thixotropic agents, thermal stabilizers, drying agents, and flame retardants. These additives, if used at all, preferably comprise not more than 25 wt.-%, more preferably not more than 15 wt.-%, even more preferably not more than 10 wt.-%, of the total weight of the acoustic damping material.

A preferred acoustic damping material comprises
- 1-15 wt.-%, preferably 1.5-3 wt.-%, based on the total weight of the acoustic damping material, of the at least one polybutadiene PB;
- 12.5-35 wt.-%, preferably 15-20 wt.-%, based on the total weight of the acoustic damping material, of the at 25° C. liquid rubber LR;
- 4.5-15 wt.-%, preferably 6-8 wt.-%, based on the total weight of the acoustic damping material, of the at least one natural or synthetic polyisoprene PI;
- 4.5-15 wt.-%, preferably 6-8 wt.-%, based on the total weight of the acoustic damping material, of at least one butyl rubber BR;
- 5-12 wt.-%, preferably 5.5-10 wt.-%, most preferably 6.5-9.5 wt.-%, based on the total weight of the acoustic damping material, of at least one hydrocarbon resin HR; and
- 5-75 wt.-%, preferably 40-65 wt.-%, of the at least one solid particulate filler FM, based on the total weight of the acoustic damping material.

The damping layer (2) is composed of a damping layer material with a viscosity at 60° C. of 30'000-500'000 Pa*s containing at least one rubber component Ru. Preferably, the damping layer material has a viscosity at 60° C. of 40'000-250'000 Pa*s, preferably 50'000-200'000 Pa*s, most preferably 65'000-150'000 Pa*s. This is advantageous with respect to increased adhesion. This is disclosed in the comparison of Ex. 1 with Ex. 2 in table 4.

Preferably, the thickness of the damping layer (2) d1 is 0.4-1.5 mm, more preferably 0.7-1.3 mm, most preferably 0.9-1.2 mm.

The damping layer material contains at least one rubber component Ru. Preferred rubber components Ru are selected from the list of at 25° C. liquid rubber LR selected from the group consisting of at 25° C. liquid polybutenes and at 25° C. liquid polyisobutylenes, butyl rubber BR, natural or synthetic polyisoprene PI, nitrile rubber NBR, ethylene-propylene terpolymer EPDM, ethylene-propylene copolymer EPM and chloroprene rubber CR, preferably selected from the list of at 25° C. liquid rubber LR selected from the group consisting of at 25° C. liquid polybutenes and at 25° C. liquid polyisobutylenes, butyl rubber BR and natural or synthetic polyisoprene PI.

More preferably, the damping layer material comprises
- 18 wt.-%, based on the total weight of the damping layer material, of at least one at 25° C. liquid rubber LR selected from the group consisting of at 25° C. liquid polybutenes and at 25° C. liquid polyisobutylenes, preferably at 25° C. liquid polyisobutylenes;
- 2-5 wt.-%, based on the total weight of the damping layer material, of at least one butyl rubber BR;
- 0.5-3 wt.-%, based on the total weight of the damping layer material, of at least one natural or synthetic polyisoprene PI, preferably natural polyisoprene, most preferably natural rubber;

5-10 wt.-%, based on the total weight of the damping layer material, of at least one hydrocarbon resin HR;

50-80 wt.-%, based on the total weight of the damping layer material, of at least one solid particulate filler FM.

Preferred at 25° C. liquid rubber LR selected from the group consisting of at 25° C. liquid polybutenes and at 25° C. liquid polyisobutylenes, butyl rubber BR, natural or synthetic polyisoprene PI, hydrocarbon resin HR and solid particulate filler FM are the ones that were indicated as preferred for the composition of the acoustic damping material before.

Another subject of the present invention is use of the vibration and noise damping element (1) according to the present invention for damping of vibrations and/or noise in transportation vehicles or white goods.

Preferably, the vibration and noise damping element has the following properties:

Temperature at which the maximum loss factor is measured (T @$LF_{max}$) is between 5° C. or 25° C., preferably between 15° C. or 25° C., and Value of the maximum loss factor ($LF_{max}$) is ≥0.3, preferably ≥0.35, preferably ≥0.39, preferably ≥0.40, most preferably ≥0.41.

Preferably, the loss factor is determined by using the measurement method as defined in ISO 6721 standard, more preferably as described in the experimental section.

Figure 2:
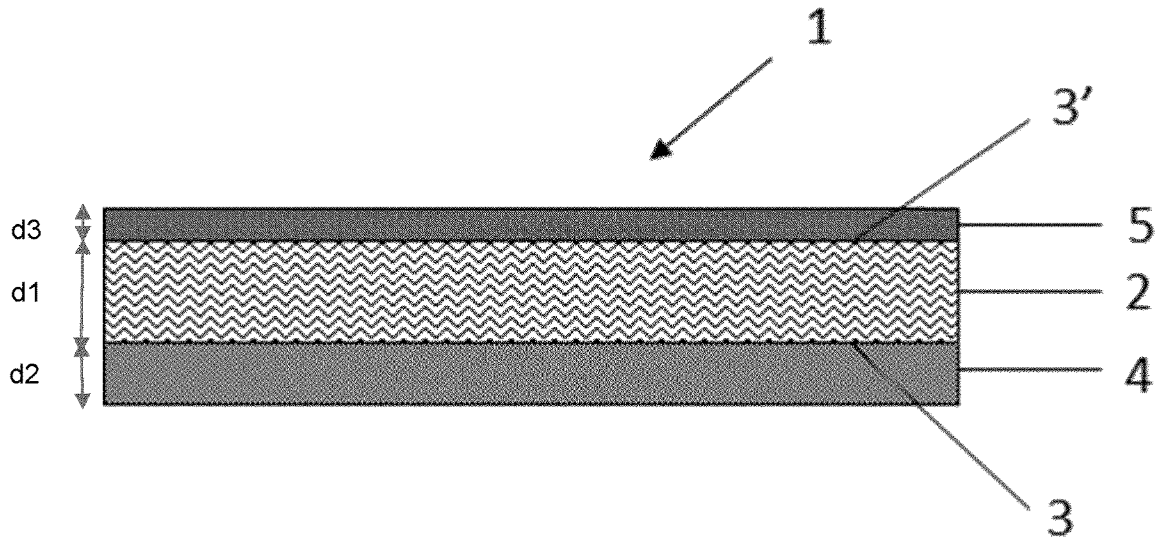
FIG. 2 shows a cross-section of a vibration and noise damping element (1) comprising a damping layer (2) having a first (3) surface and a second surface (3'), an adhesive layer (4) covering the first surface (3) of the damping layer (2), and a constrained layer (5) covering the second surface (3') of the damping layer (2).

According to a preferred embodiment, the vibration and noise damping element further comprises, in addition to the damping layer and the adhesive layer, a constrained layer covering at least a portion of the second surface of the damping layer. The vibration and noise damping element according to these embodiments are generally known as "constrained layer dampers". The damping layer and the constrained layer are preferably directly connected to each other over their opposing surfaces, preferably the damping layer is sandwiched between the adhesive layer and the constrained layer. According to one or more embodiments, the constrained layer covers substantially, preferably completely, the entire area of the second surface of the damping layer. A cross-section of a vibration and noise damping element according to these embodiments is shown in FIG. 2.

According to one or more embodiments, the constrained layer is a metal sheet, preferably aluminum or steel sheet or a polymeric sheets, preferably glass fiber reinforced polymer sheet. Preferably, the constrained layer is a metal sheet, more preferably an aluminum sheet.

The thickness of the constrained layer d3 is not particularly restricted but the use of constrained layers that are thinner than the damping layer is generally preferred. Preferred thickness also depends on the material of the constrained layer. According to one or more embodiments, the constrained layer has a thickness of 0.05-1.5 mm, preferably 0.1-1.25 mm, more preferably 0.1-1.0 mm.

Most preferably, the constrained layer is a metal sheet having a thickness d3 of 0.05-0.6 mm, preferably 0.1-0.5 mm, more preferably 0.2-0.4 mm.

According to one or more further embodiments, the constrained layer is a polymeric sheet having a thickness of 0.1-1.2 mm, preferably 0.25-1.0 mm.

It is preferred that the constrained layer has an elastic modulus, which is larger than that of the damping layer, such larger by at least the factor 3, preferably at least the factor 5, more preferably at least a factor of 10, wherein the elastic modulus is measured by using the method as defined in ISO 6892-1:2016 standard (for metallic sheets) or as defined in ISO 527-2 standard (for polymeric sheets).

According to a preferred embodiment, the vibration and noise damping element consists of a damping layer, an adhesive layer and a constrained layer.

Another preferred embodiment contains in addition a protective film on the side of the adhesive layer that is not in contact with the damping layer. The protective film is preferably a release liner. Such a release liner preferably peels away with an easy peel, does not stick aggressively and does not become difficult to remove from the adhesive layer after. The protective film can be made from numerous materials but is preferably differentiated from the compositions used to prepare the adhesive layer. The materials used for the protective film are selected more particularly from the group consisting of paper, silicone or fluorocarbon treated material, polyesters, polyvinyl chloride, cellulose acetate, polypropylene, polyethylene and polyethylene terephthalate films. Preferably, protective film is made from silicon-based material.

Preferred sizes for the vibration and noise damping element are elements that are 20-1000 mm, more preferred 50-500 mm, most preferred 100-400 mm in length and in width.

Another subject of the present invention is a method for applying a vibration and noise damping element according to the present invention to a noise emitting surface of a substrate, the method comprising steps of:

I) Providing a vibration and noise damping element according to the present invention, II) Contacting the outer major surface of the adhesive layer of the vibration and noise damping element with the noise emitting surface and applying sufficient pressure to form an adhesive bond or II') Heating the adhesive layer and/or the substrate and contacting the outer major surface of the adhesive layer with the noise emitting surface and forming an adhesive bond by cooling of the adhesive layer.

The term "outer major surface" of the adhesive layer refers to the major surface of the adhesive layer on the side opposite to the side of the damping layer. The substrate having a noise emitting surface can be any type of shaped article, such as a panel, a sheet, or a film, composed, for example, of metal, plastic, or fiber reinforced plastic. The heating of the adhesive layer and/or the substrate in step II)' can be conducted using any conventional techniques, such as heating in an oven, heating by air stream, or heating with infrared (IR)-radiation.

Figure 3:
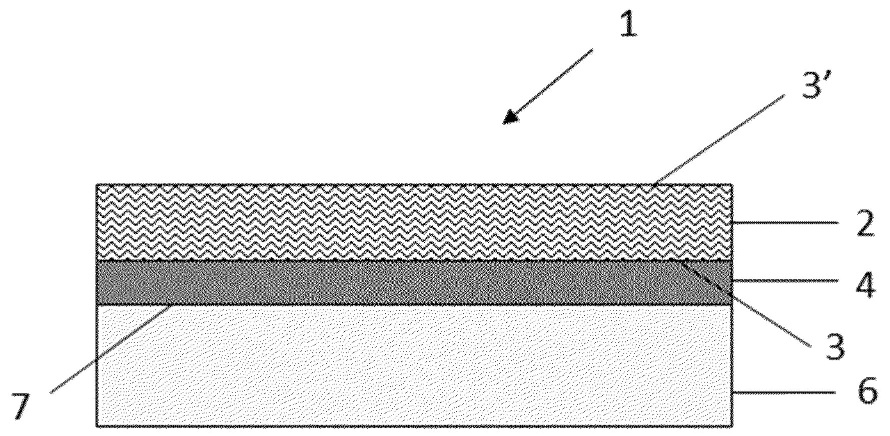
FIG. 3 shows a cross-section of a vibration damped system comprising a substrate (6) having a noise emitting surface (7) and a vibration and noise damping element (1) comprising a damping layer (2) and an adhesive layer (4), wherein the first surface (3) of the damping layer (2) is adhesively bonded to the noise emitting surface (7) via the adhesive layer (4).

Still another subject of the present invention is a vibration damped system comprising a substrate (6) having a noise emitting surface (7) and a vibration and noise damping element (1) according to the present invention, wherein least a portion of the first surface (3) of the damping layer (2) is adhesively bonded to the noise emitting surface (7) via the adhesive layer (4). A cross-section of a vibration damped system is shown in FIG. 3.

Figure 4:
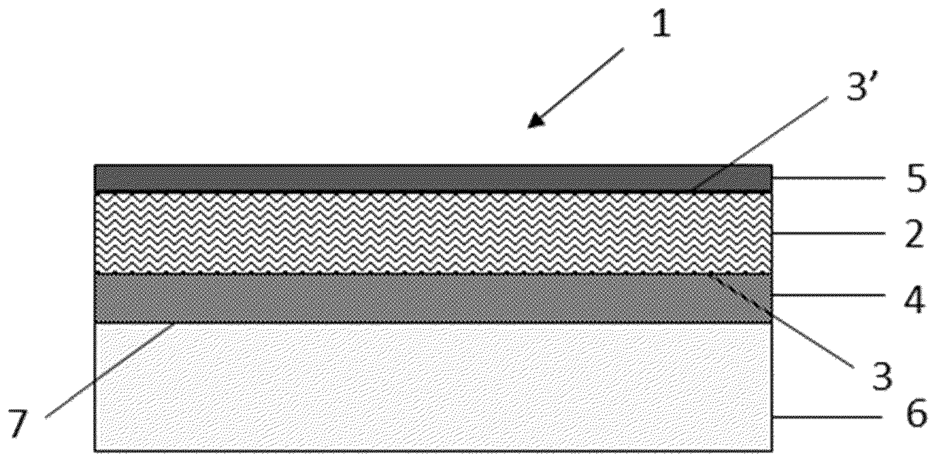
FIG. 4 shows a cross-section of a vibration damped system comprising a substrate (6) having a noise emitting surface (7) and a vibration and noise damping element (1) comprising a damping layer (2), an adhesive layer (4), and a constrained layer (5), wherein the first surface (3) of the damping layer (2) is adhesively bonded to the noise emitting surface (7) via the adhesive layer (4) and wherein the damping layer (2) is sandwiched between the adhesive layer (4) and the constrained layer (5).

According to one or more embodiments, the vibration and noise damping element (1) is a constrained damping element comprising a constrained layer (5), wherein the damping layer (2) is sandwiched between the adhesive layer (4) and a constrained layer (5). A cross-section of a vibration damped system according to these embodiments is shown in FIG. 4.

According to one or more embodiments, the substrate having the noise emitting surface is part of a structure of an automotive vehicle or a white good.

Examples

The followings products shown in table 2 and 3 were used in the examples of table 4 and 5.

TABLE 1

| | |
|---|---|
| PB | Polyvest EP MV, Viscosity @ 20° C. = 5'000-7'000 mPa*s, Mn = 1'700-2'700 g/mol, Tg −65° C., units of the formula (I) 61%, formula (II) 2%, formula (III) 37%, Evonik |
| LR | PIB 32, at 25° C. liquid synthetic polyisobutylene, Mn: 1300 g/mol, Braskem |
| PI | Natural rubber, Mooney viscosity: 50 +/− 5 MU (ML (1 + 4) 100° C.) |
| BR | Brominated isobutylene-isoprene copolymer, X Butyl BB 2030, Mooney viscosity: 32 +/− 4 MU (ML (1 + 8) 125° C.), Arlanxeo |
| HR | Wingtack 95, Hydrocarbon resin, Softening Point: 98° C., Mn: 1,700 g/mol, Cray Valley |
| Calcit | Calcit |
| HDK | HDK, fumed silica, Wacker |
| CaO | Calcium oxide |
| Pigment | Carbon black |
| Anti-oxidant | Sterically hindered phenolic primary antioxidant |
| P | At 25° C. solid amorphous poly-α-olefin |

Preparation of the Material Compositions

The adhesive layer material compositions AC1, AC hv (high viscosity) and AC lv (low viscosity) as well as the damping layer material compositions DC1, DC hv (high viscosity) and DC lv (low viscosity) used in the Ex. 1 to Ex. 6 as well as the reference examples Ref. 1 to Ref. 9 shown in table 4 and table 5 were prepared according to the following procedure.

In a first step, the components for the adhesive layer material compositions were mixed with following components:

TABLE 2

| Components | AC1 Wt.-% | AC hv Wt.-% | AC1 lv Wt.-% |
|---|---|---|---|
| PB | 2 | 2 | 2 |
| LR | 16 | 8 | 24 |
| PI | 6.4 | 6.4 | 6.4 |
| BR | 6.8 | 6.8 | 6.8 |
| HR | 8.5 | 8.5 | 8.5 |
| Calcit | 56.6 | 64.6 | 48.6 |
| HDK | 0.4 | 0.4 | 0.4 |
| CaO | 2.9 | 2.9 | 2.9 |
| Pigment | 0.2 | 0.2 | 0.2 |
| Antioxidant | 0.2 | 0.2 | 0.2 |
| Total | 100 | 100 | 100 |
| Viscosity @ 60° C. [Pa*s] | 75'300 | 436'000 | 46'700 |
| Viscosity @ 100° C. [Pa*s] | 35'150 | 231'500 | 18'750 |

In a first step, the components BR, PI, HR and a half of the calcit were mixed in a batch type mixer. After that, the remaining raw materials was added constantly over a time of 1 hour and mixed during 20 min. The mixed compositions were then stored in unsealed drums and used immediately after mixing.

In a second step, the components for the damping layer material compositions were mixed with following components:

TABLE 3

| Components | DC1 Wt.-% | DC hv Wt.-% | DC1 lv Wt.-% |
|---|---|---|---|
| LR | 14 | 8 | 20 |
| PI | 1.5 | 1.5 | 1.5 |
| BR | 3.0 | 3.0 | 3.0 |
| HR | 7.0 | 7.0 | 7.0 |
| P | 4.5 | 4.5 | 4.5 |
| Calcit | 66.3 | 72.3 | 60.3 |
| HDK | 0.4 | 0.4 | 0.4 |
| CaO | 2.9 | 2.9 | 2.9 |
| Pigment | 0.2 | 0.2 | 0.2 |
| Antioxidant | 0.2 | 0.2 | 0.2 |
| Total | 100 | 100 | 100 |
| Viscosity @ 60° C. [Pa*s] | 138'400 | 1'227'000 | 64'400 |
| Viscosity @ 100° C. [Pa*s] | 48'400 | 394'800 | 19'600 |

In a first step, the components BR, PI, HR and a half of the calcit were mixed in a batch type mixer. After that, the remaining raw materials was added constantly over a time of 1 hour and mixed during 20 min. The mixed compositions were then stored in unsealed drums and used immediately after mixing.

For the following tests, test samples (vibration and noise damping elements) were produced with an adhesive layer (if present), a damping layer (if present) on top of the adhesive layer, an aluminum layer (constrained layer), ratio of the thickness of the damping layer d1 to the thickness of the adhesive layer d2 (d1/d2) and a sum of the thickness of the damping layer d1 and the thickness of the adhesive layer d2 (d1+d2). The structure of the test samples as well as the test results are shown in table 4 and table 5.

Viscosity:

The viscosity was measured according to DIN 54458 oscillographically by means of a rheometer with heatable plate (MCR 301, AntonPaar) (gap 500 μm, measuring plate diameter: 25 mm (plate/plate), deformation 1%, angular frequency 10 rad/s, temperature: 60° C. or 100° C.).

Measurement of resistance to high temperatures ("Resistance ht") The heat resistance test at 210° C. was performed according to the BMW group standard, "Adhesives and sealing materials used in the body shop Damping pad", Requirements and testings, GS 97028-16:2012-02 page 4, table 1: Resistance to high temperature ("Wärmetest"), AA-0415, edition 2018-10. The test samples had a length/width of 16 cm×7 cm.

Grading System:

There should be no blistering, no dissolution, no slipping and no shrinkage in order to obtain the grade=OK.

Measurement/Determination Adhesion at Low Temperatures by the Ball Drop Test at −30° C. ("Bdt −30° C.")

The ball drop test at −30° C. was performed according to the Volkswagen group standard, quality requirements, self-adhesive stiffening pads and sound deadening pads, QP M052 page 12, point 3.7.5 Ball drop test/determination of cold adhesion ("Kugelfall/Bestimmung der Kältehaftung"), PV 3971, edition 2020-03. The test samples had a length/width of 7 cm×7 cm.

Grading System:

Grade 1: No cracking or splintering of the specimens, no chippings from the test sheet Grade 2: Cracking or splintering of the specimens, but no chippings from the test sheet Grade 3: No chipping from the test sheet; however, specimens can be delaminated from the test sheet by means of small bending loads Grade 4: Cracking or splintering of the specimens, partial chipping from the test sheet Grade 5: Cracking or splintering of the specimens, large-scale chipping from the test sheet Grade 6: Complete delamination from the test sheet Measurement of the Adhesion/Peel Strength ("Peel Strength")

The peel strength test was performed according to the BMW group standard, Adhesives and sealing materials used in the body shop Damping pad, Requirements and testing, GS 97028-16: 2012-02 page 4, table 1: Adhesion ("Peel-resistance of sound deadening and stiffening materials in the body shop"), AA-0007, edition 2018-10. The test samples had a length/width of 20 cm×3 cm. In addition, the fracture pattern was visually analyzed.

Grading System:

on oiled steel after 30 min room temperature: >1.5 N/cm on oiled steel after 30 min 195° C.: >4 N/cm Measurement of the Loss Factor ("Loss Factor")

The loss factors for the test specimen were determined by using the measurement method as defined in ISO 6721 standard. The measurements were conducted at 200 Hz anti-resonance point and at a temperature range of 20 to 60° C. using a commercially available loss factor tester. The test samples had a length/width of 20 cm×1 cm.

It is advantageous if the highest value of the loss factor in table 4 and table 5 is measured at 10° C. or 20° C., preferably 20° C., because this temperature is the most common operating temperature in a vehicle.

Stackability 10 specimens of each type of test sample with a release liner made of siliconized protective film on each adhesive layer, measuring 100 mm×100 mm (length/width), were stacked on top of each other between 2 glass panels under a load of 75 N and aged in a forced-air oven for 24 h at 50° C. 3 specimens each were analyzed under a microscope with 20× magnification at 10 different locations at the edge of the specimen to determine the mean distance in mm of the lateral leakage of the adhesive layer and/or damping layer. Specimens with mean distance values of more than 0.90 mm were difficult to be separated or unstacked.

TABLE 4

| Vibration and noise damping elements | Ref. 1 | Ex. 1 | Ref. 2 | Ref. 3 | Ref. 4 | Ex. 2 | Ref. 5 | Ref. 1 | Ref. 6 |
|---|---|---|---|---|---|---|---|---|---|
| Type damping layer composition | DC1 | DC1 | DC1 | DC1 | DC hv | DC lv | none | DC1 | DC1 |
| Type adhesive layer composition | none | AC1 | AC hv | AC lv | AC1 | AC1 | AC1 | none | AC1 |
| Thickness damping layer [mm] | 1.7 | 1.1 | 1.1 | 1.1 | 1.1 | 1.1 | 0 | 1.7 | 1.4 |
| Thickness adhesive layer [mm] | 0 | 0.6 | 0.6 | 0.6 | 0.6 | 0.6 | 1.7 | 0 | 0.3 |
| Thickness aluminium constrained layer [mm] | 0.3 | 0.3 | 0.3 | 0.3 | 0.3 | 0.3 | 0.3 | 0.3 | 0.3 |
| d1/d2 | — | 1.83 | 1.83 | 1.83 | 1.83 | 1.83 | — | — | 4.67 |
| d1 + d2 [mm] | 1.7 | 1.7 | 1.7 | 1.7 | 1.7 | 1.7 | 1.7 | 1.7 | 1.7 |
| Loss factor | | | | | | | | | |
| 30° C. | 0.373 | 0.293 | 0.324 | 0.243 | 0.406 | 0.285 | 0.252 | 0.373 | 0.335 |
| 20° C. | 0.420 | 0.387 | 0.373 | 0.387 | 0.420 | 0.429 | 0.412 | 0.420 | 0.443 |
| 10° C. | 0.289 | 0.357 | 0.267 | 0.422 | 0.294 | 0.399 | 0.417 | 0.289 | 0.313 |
| 0° C. | 0.162 | 0.195 | 0.152 | 0.267 | 0.177 | 0.227 | 0.282 | 0.162 | 0.163 |
| Bdt −30° C. | 6 | 1 | 6 | 1 | 1 | 1 | 1 | 6 | 5 |
| Resistance ht | OK | OK | OK | OK | OK | OK | OK | OK | OK |
| Peel strength [N/cm] | 9.1 | 10.8 | 5.1 | 12.5 | 6.85 | 10.21 | 11.4 | 9.1 | 10.1 |
| Stackability [mm] | 0.72 | 0.79 | 0.77 | 1.03 | 0.49 | 0.78 | 0.94 | 0.72 | 0.82 |

TABLE 5

| Vibration and noise damping elements | Ex. 1 | Ex. 3 | Ref. 7 | Ref. 8 | Ref. 5 | Ex. 4 | Ex. 5 | Ex. 1 | Ex. 6 | Ref. 9 |
|---|---|---|---|---|---|---|---|---|---|---|
| Type damping layer composition | DC1 | DC1 | DC1 | DC1 | none | DC1 | DC1 | DC1 | DC1 | DC1 |
| Type adhesive layer composition | AC1 | AC1 | AC1 | AC1 | AC1 | AC1 | AC1 | AC1 | AC1 | AC1 |
| Thickness damping layer [mm] | 1.1 | 0.85 | 0.6 | 0.3 | 0 | 0.45 | 0.8 | 1.1 | 1.45 | 1.8 |
| Thickness adhesive layer [mm] | 0.6 | 0.85 | 1.1 | 1.4 | 1.7 | 0.25 | 0.4 | 0.6 | 0.75 | 0.9 |
| Thickness aluminium constrained layer [mm] | 0.3 | 0.3 | 0.3 | 0.3 | 0.3 | 0.3 | 0.3 | 0.3 | 0.3 | 0.3 |
| d1/d2 | 1.83 | 1.00 | 0.55 | 0.21 | 0.00 | 1.80 | 2.00 | 1.83 | 1.93 | 2.00 |
| d1 + d2 [mm] | 1.7 | 1.7 | 1.7 | 1.7 | 1.7 | 0.7 | 1.2 | 1.7 | 2.2 | 2.7 |
| Loss factor | | | | | | | | | | |
| 30° C. | 0.293 | 0.293 | 0.272 | 0.257 | 0.252 | 0.201 | 0.267 | 0.293 | 0.383 | 0.428 |
| 20° C. | 0.387 | 0.420 | 0.404 | 0.395 | 0.412 | 0.229 | 0.346 | 0.387 | 0.546 | 0.575 |
| 10° C. | 0.357 | 0.412 | 0.413 | 0.417 | 0.417 | 0.173 | 0.258 | 0.357 | 0.408 | 0.476 |
| 0° C. | 0.195 | 0.2 | 0.232 | 0.236 | 0.282 | 0.108 | 0.146 | 0.195 | 0.227 | 0.234 |
| Bdt −30° C. | 1 | 1 | 1 | 1 | 1 | 1 | 1 | 1 | 4 | 5 |

TABLE 5-continued

| Vibration and noise damping elements | Ex. 1 | Ex. 3 | Ref. 7 | Ref. 8 | Ref. 5 | Ex. 4 | Ex. 5 | Ex. 1 | Ex. 6 | Ref. 9 |
|---|---|---|---|---|---|---|---|---|---|---|
| Resistance ht | OK | OK | OK | OK | OK | OK | OK | OK | OK | OK |
| Peel strength [N/cm] | 10.8 | 11.4 | 9.2 | 9.0 | 11.4 | 7.2 | 8.4 | 10.8 | 8.3 | 9.7 |
| Stackability [mm] | 0.79 | 0.83 | 0.94 | 0.94 | 0.94 | 0.39 | 0.61 | 0.79 | 0.81 | 0.83 |

The invention claimed is:

1. A vibration and noise damping element comprising:

a damping layer having a first surface and a second surface; and an adhesive layer covering at least a portion of the first surface of the damping layer, wherein:

the damping layer is composed of a damping layer material with a viscosity at 60° C. of 30'000-500'000 Pa*s containing at least one rubber component Ru;

the adhesive layer is composed of an adhesive layer material with a viscosity at 60° C. of 50'000-300'000 Pa*s containing the at least one rubber component Ru;

a ratio of a thickness of the damping layer d1 to a thickness of the adhesive layer d2 (d1/d2) is 0.6-4.0;

a sum of the thickness of the damping layer d1 and the thickness of the adhesive layer d2 (d1+d2) is 0.5-2.5 mm;

the viscosity is determined according to DIN 54458 oscillographically by means of a rheometer with a heatable plate measured at gap 500 µm, measuring plate diameter: 25 mm (plate/plate), deformation 1%, angular frequency 10 rad/s;

the adhesive layer comprises, based on a total weight of the adhesive laver:

1-15 wt.-% of at least one polybutadiene PB;

12.5-35 wt.-% of an at 25° C. liquid rubber LR;

4.5-15 wt-% of at least one natural polyisoprene or synthetic polyisoprene PI;

4.5-15 wt.-% of at least one butyl rubber BR;

5-12 wt.-% of at least one hydrocarbon resin HR; and 5-75 wt.-% of at least one solid particulate filler FM; and the damping layer comprises, based on a total weight of the damping layer:

10-18 wt.-% of at least one at 25° C. liquid rubber LR;

2-5 wt.-% of at least one butyl rubber BR;

0.5-3 wt-% of at least one natural polyisoprene or synthetic polyisoprene PI;

5-10 wt.-% of at least one hydrocarbon resin HR; and 50-80 wt-% of at least one solid particulate filler FM.

2. The vibration and noise damping element according to claim 1, wherein the damping layer material has a viscosity at 60° C. of 40'000-250'000 Pa*s.

3. The vibration and noise damping element according to claim 1, wherein the adhesive layer material has a viscosity at 60° C. of 60'000-200'000 Pa*s.

4. The vibration and noise damping element according to claim 1, wherein the damping layer material is not identical to the adhesive layer material.

5. The vibration and noise damping element according to claim 1, wherein the ratio of the thickness of the damping layer d1 to the thickness of the adhesive layer d2 (d1/d2) is 0.8-3.0.

6. The vibration and noise damping element according to claim 1, wherein the sum of the thickness of the damping layer d1 and the thickness of the adhesive layer d2 (d1+d2) is 0.75-2.1 mm.

7. The vibration and noise damping element according to claim 1, wherein the damping layer material has a viscosity at 100° C. of 20'000-150'000 Pa*s.

8. The vibration and noise damping element according to claim 1, wherein the adhesive layer material has a viscosity at 100° C. of 60'000-200'000 Pa*s.

9. The vibration and noise damping element according to claim 1, wherein the thickness of the damping layer d1 is 0.4-1.5 mm.

10. The vibration and noise damping element according to claim 1, wherein the thickness of the adhesive layer d2 is 0.25-0.85 mm.

11. The vibration and noise damping element according to claim 1, wherein the adhesive layer material has an adhesion of ≤grade 3, determined by a ball drop test at −30° C. according to a Volkswagen group standard, quality requirements, self-adhesive stiffening pads and sound deadening pads, QP M052 page 12, point 3.7.5 Ball drop test/determination of cold adhesion ("Kugelfall/Bestimmung der Kältehaftung"), PV 3971, edition 2020-03, using test samples with a length/width/thickness of the adhesive layer material of 7 cm×7 cm×1.7 mm with an aluminum layer with a thickness of 0.3 mm on top of the adhesive layer material.

12. The vibration and noise damping element according to claim 1 further comprising a constrained layer covering at least a portion of the second surface of the damping layer.

13. The vibration and noise damping element according to claim 12, wherein the damping layer and the constrained layer are directly connected to each other over their opposing surfaces.

14. The vibration and noise damping element according to claim 12, wherein the constrained layer is a metal sheet; and the thickness of the constrained layer d3 is 0.05-0.6 mm.

15. The vibration and noise damping element according to claim 1, wherein the vibration and noise damping element has the following properties:

temperature at which a maximum loss factor is measured, T @$LF_{max}$ is between 5° C. or 25° C., and value of the maximum loss factor, $LF_{max}$, is ≥0.3, whereby a loss factor is determined by using a measurement method as defined in ISO 6721 standard.

* * * * *